L. E. WAITE.
SPINDLE DRIVING MECHANISM FOR MACHINE TOOLS.
APPLICATION FILED JUNE 16, 1919.

1,340,585.

Patented May 18, 1920.
3 SHEETS—SHEET 1.

WITNESSES
R. F. Dilworth

INVENTOR
L. E. Waite
by F. N. Barber
attorney

L. E. WAITE.
SPINDLE DRIVING MECHANISM FOR MACHINE TOOLS.
APPLICATION FILED JUNE 16, 1919.
1,340,585.
Patented May 18, 1920.
3 SHEETS—SHEET 2.
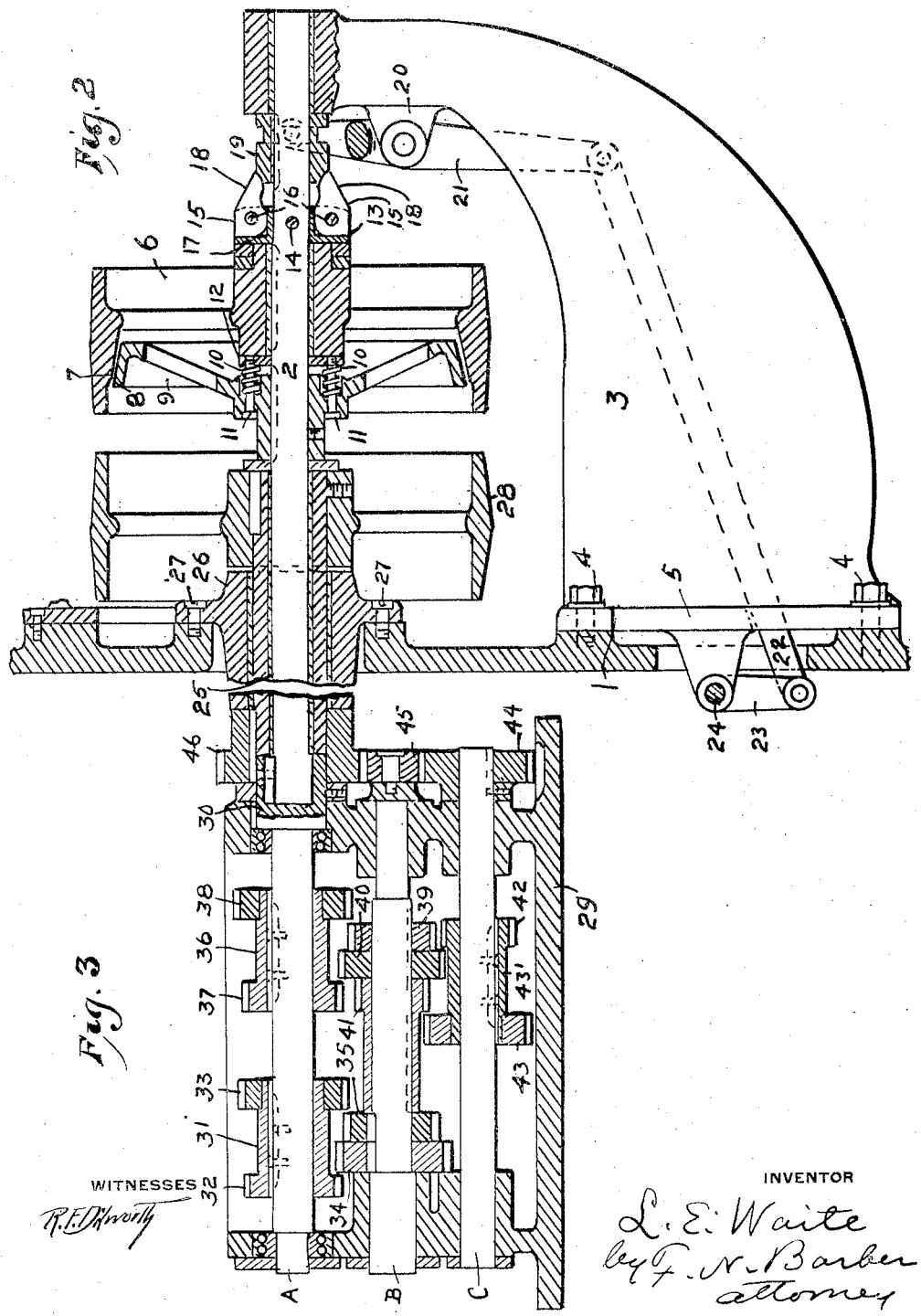
INVENTOR
L. E. Waite
by F. N. Barber
attorney
WITNESSES
R. E. Dilworth L. E. WAITE.
SPINDLE DRIVING MECHANISM FOR MACHINE TOOLS.
APPLICATION FILED JUNE 16, 1919.

1,340,585.

Patented May 18, 1920.
3 SHEETS—SHEET 3.

WITNESSES

INVENTOR

UNITED STATES PATENT OFFICE.

LORENZO E. WAITE, OF TOLEDO, OHIO.

SPINDLE-DRIVING MECHANISM FOR MACHINE-TOOLS.

1,340,585. Specification of Letters Patent. Patented May 18, 1920.

Application filed June 16, 1919. Serial No. 304,695.

*To all whom it may concern:*

Be it known that I, LORENZO E. WAITE, a citizen of the United States, residing at Toledo, in the county of Lucas and State of Ohio, have invented new and useful Improvements in Spindle-Driving Mechanisms for Machine-Tools, of which the following is a specification.

My invention relates to driving mechanisms for the spindles of milling machines and other machine tools.

The principal object of this invention is to provide a mechanism whereby the spindles and similar elements of machine tools, such as milling machines, may be driven at a large number of speeds by a very compact arrangement of gears within the column or main casing of the tool, together with the assembly of the main driving and driven pulleys close together in coaxial alinement. Other objects appear in the course of the description following.

Figure 1:
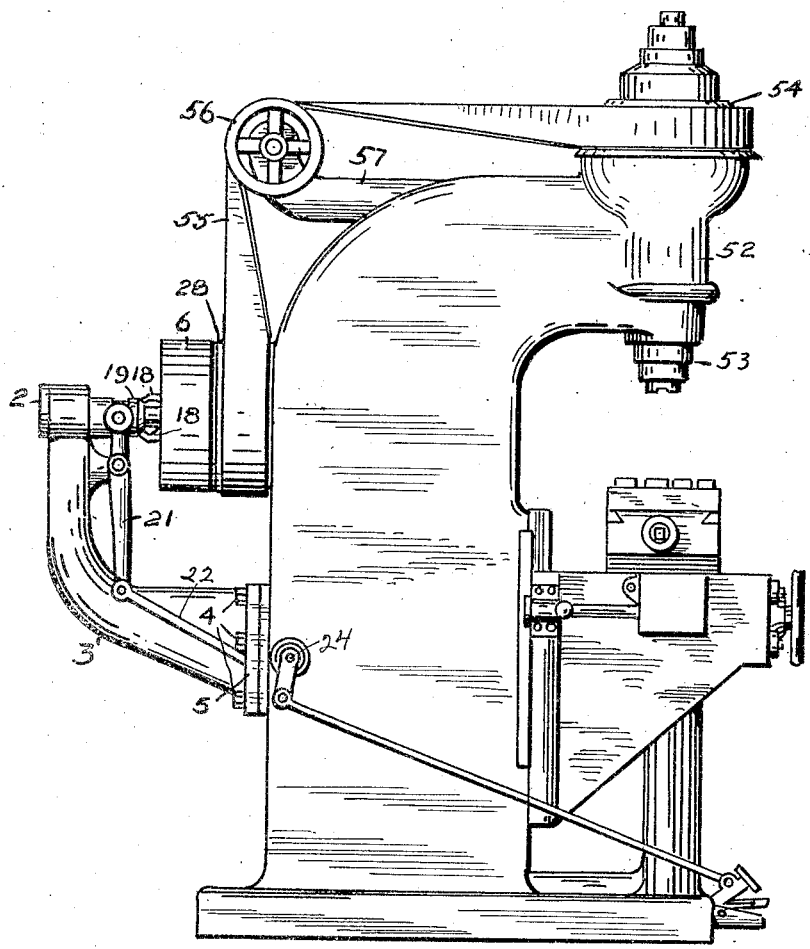
Figure 4:
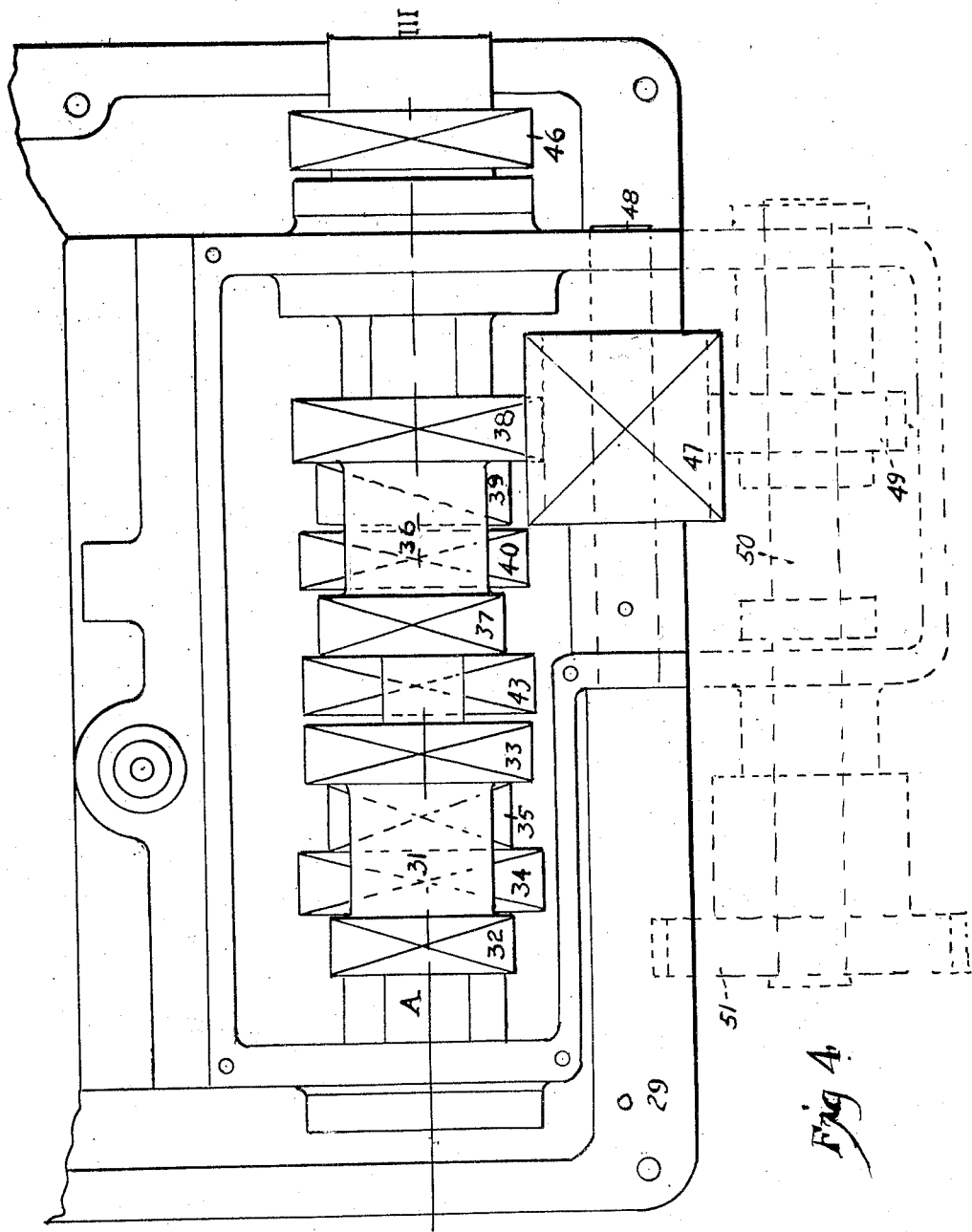

Referring to the accompanying drawings, Figure 1 is a side view of a milling machine containing my invention; Fig. 2, a vertical section of a portion of the column, the driving pulley and adjacent mechanism; Fig. 3, a horizontal section of the speed-changing mechanism, taken on the line III—III, Fig. 4; and Fig. 4, a side view of the speed case and the speed-changing mechanism, the side of the speed-case being removed. The shaft 2 in Fig. 1 is in axial alinement with the shaft A of Fig. 3, the latter having been rotated toward the observer 90° from the plane on which Fig. 1 has been taken.

On the drawing, 1 designates the column of a milling machine. The outer end of the main driving shaft 2 has bearing on the upper end of the arm 3 secured to the column by the bolts 4 passing through the foot 5 of the arm into the column.

6 is the main driving pulley loose on the shaft 2 and having the tapered clutch surface 7 beneath its rim. This surface coacts with a similar external clutch surface 8 on the clutch member 9 keyed to the said shaft. The clutch surfaces 7 and 8 are urged apart by the springs 10 on the bolts 11, which extend through the hub of the member 9 and are screwed into the ring 12 slidable on the shaft 2 between the hubs of the pulley 6 and the member 9. The heads of the bolts bear on that end of the clutch member 9 length of the bolts is such that the springs may cause the ring 12 to push the pulley 6 outwardly sufficiently to separate the clutch surfaces 7 and 8. There is enough play between the ring and the member 9 to allow the surfaces 7 and 8 to become frictionally connected when the pulley 6 is pushed toward the member 9.

13 is a collar secured to the shaft 2 by the pin 14 and carrying a number of radially swinging cams 15 mounted on the pins 16 and bearing on the ring 17 slidable on the shaft between the pulley 6 and the said collar. The cams 15 have the arms 18 engageable with the tapered end of the sliding member 19 splined to the shaft 2. The arm 3 carries the lug 20 to which the lever 21 is pivoted between its ends. The upper end of the lever serves to slide the member 19 on the shaft 2 so as to cause the said member to oscillate the cams 15 and move the pulley to the left and the clutch surfaces into engagement. The lower end of the lever 21 is connected by the link 22 to the arm 23 of the rock-shaft 24 operable by any desired means.

The inner end of the shaft 2 is journaled in the sleeve 25, which has bearing in the journal 26 secured to the column by the screws 27. The sleeve 25 runs loose on the shaft 2 and has keyed thereon the pulley or belt-wheel 28 for driving the spindle.

29 is the speed case within the column 1. In this case are the three parallel shafts A, B, and C, the shaft A being in alinement with the shaft 2 and having in one end the socket 30 to receive the shaft 2 keyed therein. The shaft A carries with it the slidable sleeve 31 bearing the two gears 32 and 33, the former engageable with the gear 34 and the latter with the gear 35, both rigidly connected to the shaft B.

36 is a sleeve slidable on the shaft and rotatable therewith, and bears the two gears 37 and 38, the former engageable with the gear 39 and the latter with the gear 40, both rigidly connected to the shaft B. The shaft B has also rigid therewith the gear 41. The shaft C has thereon the slidable gears 42 and 43 carried by the sleeve 43', the former engageable with the gear 39 and the latter with the gear 41.

The shaft C, which is rotated by the gear 42 or 43, has the gear 44 keyed thereto and meshes with the gear 46 keyed to the sleeve 25 and surrounding the socket 30, the gears 44 and 45 being outside the speed case 29.

The gears within the speed case 29 are of different sizes on the same shaft, and the sizes of the gears on one shaft differ from those on the others, so that with the gearing shown the belt-wheel may receive 8 different speeds from the pulley 6. I have not shown any devices for shifting the gear-carrying sleeves 31, 36, and 43', as such devices are well known.

47 is a gear turning on the shaft 48 and meshing with the gear 38. The gear 47 drives the gear 49 on the shaft 50, the latter being connected to the gear 51 which may drive any other set of gears, as the quick traverse gearing for the table and carriage of a milling machine.

The top of the column 1 has the arm 52 supporting the spindle 53, having the pulley 54 at its upper end above the arm 52. The belt 55 passes around the pulleys 28 and 54 and over the horizontal idlers 56 supported by the arm 57 projecting back from the top of the column.

I claim—

1. In a mechanism of the class described, a hollow column, a spindle supported thereby, a pulley on the spindle, a shaft member and a sleeve member loose thereon, both supported by the column, a driving pulley on one member, a driven pulley on the other member, a driving connection between the spindle pulley and the driven pulley, a speed-casing within the column, and a set of speed-changing gears carried by the casing and having their initial and final gears operatively connected respectively to the said members.

2. In a mechanism of the class described, a hollow column, a spindle supported thereby, a pulley on the spindle, a driving shaft and a sleeve thereon, both supported by the column, a driving pulley on the shaft, a driven pulley on the sleeve, a train of speed-changing gearing within the column having its initial gear operatively connected to the driving shaft and its final gear operatively connected to the sleeve and a belt connecting the spindle pulley and the driven pulley.

Signed at Toledo, Ohio, this 13th day of June, 1919.

LORENZO E. WAITE.